D. MORGAN.
APPARATUS FOR EXHAUSTING AND COMPRESSING AIR.
APPLICATION FILED JULY 18, 1918.
1,308,603.
Patented July 1, 1919.
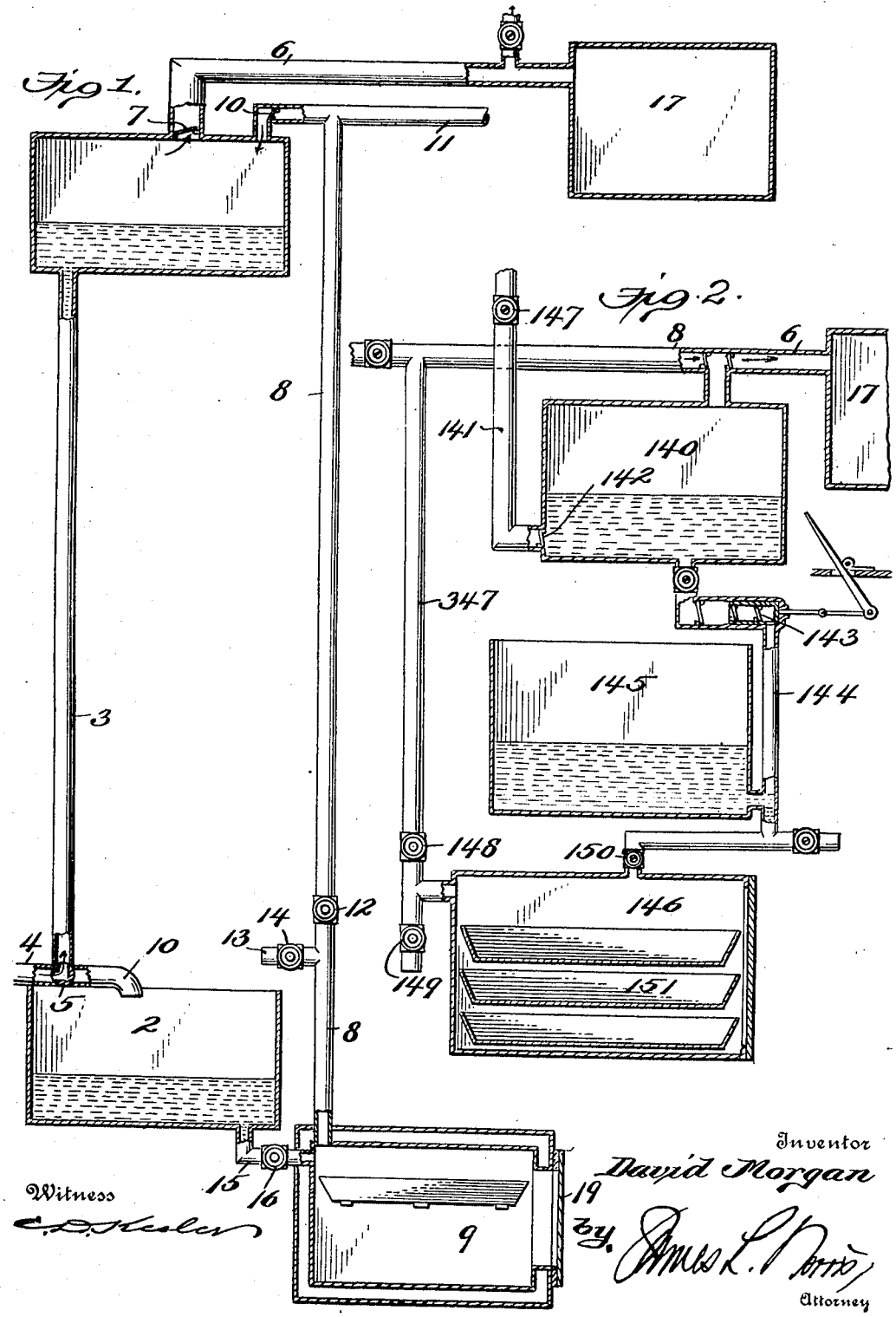

UNITED STATES PATENT OFFICE.

DAVID MORGAN, OF LAUNCESTON, TASMANIA, AUSTRALIA.

APPARATUS FOR EXHAUSTING AND COMPRESSING AIR.

1,308,603.   Specification of Letters Patent.   Patented July 1, 1919.

Application filed July 18, 1918.   Serial No. 245,570.

*To all whom it may concern:*

Be it known that I, DAVID MORGAN, a subject of the King of Great Britain, residing at 29 Frankland street, Launceston, in the State of Tasmania, Commonwealth of Australia, monumental mason, have invented certain new and useful Apparatus for Exhausting and Compressing Air, of which the following is a specification.

This invention refers to apparatus for producing vacuum and compressed air, and according to one application it is useful for exhausting air from chambers or vessels or from the hollow walls or jackets, ceiling, covers, floors or doors thereof for the purpose of preserving animal or vegetable matter stored in said chambers or vessels. The apparatus is also suitable for use in connection with milking machines, for operating other machinery, or other purposes for which vacuum or compresed air is used.

According to one arrangement of the apparatus water power is employed and air is evacuated from the storage chamber or vessel by alternately filling a working cistern with water and emptying same. The cistern is either emptied by gravitation into an open cistern or a pump is employed. This system may be made automatic by the proper use of float valves of any suitable form and arrangement. In the preferred form of apparatus, hydraulic air pumping means is capable, not only of exhausting the air from a storage or vacuum chamber, but of supplying water to said vacuum chamber and also of compressing the air exhausted and delivering the same to a reservoir for other uses.

The more particular objects and nature of the invention, together with means whereby the same may be carried into effect, will best be understood from the following description of certain forms or embodiments thereof illustrated in the accompanying drawings. It will be understood, however, that the particular constructions and arrangements described and shown have been chosen for illustrative purposes merely; and that the invention, as defined by the claims hereunto appended, may be otherwise practised without departing from the spirit and scope thereof.

In said drawings:

Figure 1 is a diagrammatic view illustrating a simple form of apparatus embodying the invention.

Fig. 2 is a similar view illustrating a modified arrangement.

According to the simplest form of the invention shown in Fig. 1 and operated by water the inclosed working cistern 1 is located at a suitable height above an open cistern 2 and connected by a pipe 3 which is also connected with the water supply main 4 and a two way cock 5 controls the passage of the water from the main into working cistern 1 or allows water from the latter to flow into cistern 2. A pipe 6 leading to the atmosphere or to a compressed air reservoir 17 is connected to the top of cistern 1 and controlled by a one way outlet valve 7. Another exhaustion pipe 8 connects the top of the working cistern 1 with the cool storage chamber 9 and the upper end of said pipe is controlled by a one way inlet valve 10. This pipe may be connected with other exhaustion pipes such as 11 and it is provided with a cock 12 and with an air admission port 13 controlled by a cock 14. The open cistern 2 is connected at the bottom with the chamber 9 by a pipe 15 controlled by a cock 16. When the cock 5 is in position shown water passes up pipe 3 and fills working cistern 1 thus expelling the air out through outlet valve 7 into the air delivery pipe 6 which delivers said air to the atmosphere or passes same into the air compression reservoir 17 which would have a release valve set to open at a desired pressure.

Cock 5 is then reversed, shutting off water supply and opening discharge pipe 18 so that cistern 1 empties through pipes 3 and 18 into open cistern 2. The suction action of the descending water exhausts air from cool storage chamber 9 through pipe 8 and pipe 11 if in use, the air passing through inlet valve 10. This action is repeated by means of the control cock 5 until the required reduction of pressure is obtained in the cool storage chamber 9.

If ice is required, water from cistern 2 may be introduced into receptacles placed in the chamber 9 by opening cock 16.

The chamber 9 may be provided with a vacuum jacket and its door 19 can be opened by closing cock 12 and opening cock 14 to admit air through port 13.

Fig. 2 shows a slight variation in the arrangement of the apparatus whereby when the working cistern is not located at a sufficient height for the water to discharge by gravitation into the cistern below, a pump is employed for the purpose.

The working cistern 140 is connected with the exhaustion pipe 8 as before and the water supply pipe 141 leading to the cistern has an inlet valve 142.

The pump 143 operates in a pipe 144 connecting the working cistern 140 with the open water cistern 145, and the pipe 144 connects also with the cool storage chamber which may also be jacketed, suitable cocks being provided as illustrated.

Exhaustion pipe 8 is also connected by pipe 347 leading to the storage chamber and is provided with a cock 148 and an air admission cock 149. When cock 147 controlling the supply pipe 141 is opened, working cistern 140 is filled and expels air therefrom into pipe 6 which leads to the compression reservoir or the atmosphere, while air from pipe 8 is exhausted into working cistern when water flows out of same.

To empty cistern 140 cock 147 is closed and pump 143 operated so that open cistern 145 receives the water. If desired water may be delivered from cistern 145 through cock 150 to a tray or trays, vessel or vessels 151 in the storage chamber 146. The operation of opening cock 147 and subsequently emptying working cistern is repeated till the desired reduction of pressure is obtained in the storage chamber 146.

I claim:—

1. In an apparatus of the character described, in combination, a vacuum chamber, a working cistern, an exhaustion pipe leading from said chamber to said cistern, means whereby said cistern may be alternately filled with water and emptied, an auxiliary cistern adapted to receive water from said working cistern, a valve controlled pipe leading from said auxiliary cistern to said chamber, and inlet and outlet valves for regulating the passage of air to and from said working cistern.

2. In an apparatus of the character described, in combination, a vacuum chamber, a compressed air reservoir, a working cistern, an exhaustion pipe leading from said chamber to said cistern, a pipe leading from said cistern to said reservoir, means whereby said cistern may be alternately filled with water and emptied, an auxiliary cistern connected with said working cistern and adapted to receive water therefrom, a valve controlled pipe leading from said auxiliary cistern to said chamber, and inlet and outlet valves for regulating the passage of air to and from said working cistern.

3. In an apparatus of the character described, in combination, a vacuum chamber, a working cistern, an exhaustion pipe leading from said chamber to said cistern, inlet and outlet valves for regulating the passage of air to and from said working cistern, an auxiliary cistern, means whereby said working cistern may be alternately filled with water and emptied, said means including a pump adapted to force water from said working cistern into said auxiliary cistern, and a valve controlled pipe leading from said auxiliary cistern to said chamber.

4. In an apparatus of the character described, in combination, a vacuum chamber, a compressed air reservoir, a working cistern, an exhaustion pipe leading from said chamber to said cistern, a pipe leading from said cistern to said reservoir, inlet and outlet valves for regulating the passage of air to and from said working cistern, an auxiliary cistern, means whereby said working cistern may be alternately filled with water and emptied, said means including a pump adapted to force water from said working cistern into said auxiliary cistern, and a valve controlled pipe leading from said auxiliary cistern to said chamber.

In testimony whereof I have hereunto set my hand in presence of two subscribing witnesses.

DAVID MORGAN.

Witnesses:
WM. MARTIN,
H. J. SHIELDS.

Copies of this patent may be obtained for five cents each, by addressing the "Commissioner of Patents, Washington, D. C."